Jan. 14, 1941.    A. LAQUERRE    2,228,831
FASTENER FOR CLOTHESLINES
Filed July 2, 1940
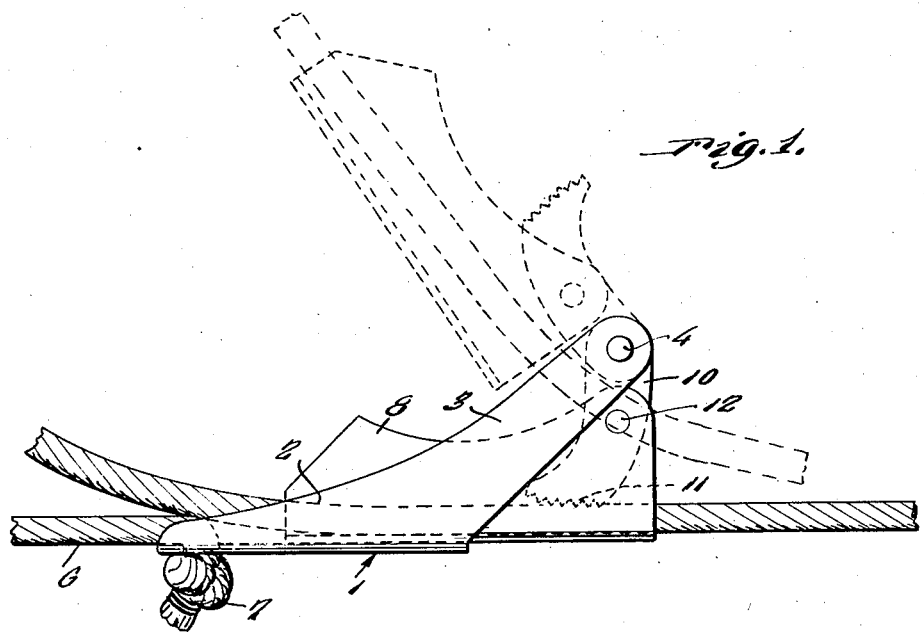
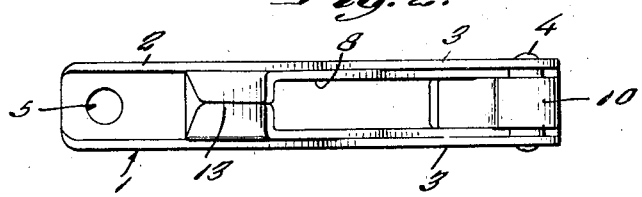
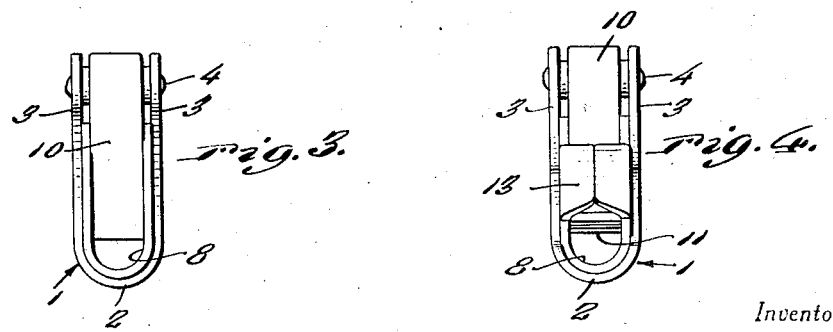
Inventor
ALPHONSE LAQUERRE
By *Clarence A. O'Brien*
*Attorney*

Patented Jan. 14, 1941

2,228,831

UNITED STATES PATENT OFFICE 2,228,831

FASTENER FOR CLOTHESLINES

Alphonse Laquerre, Woonsocket, R. I.

Application July 2, 1940, Serial No. 343,666

2 Claims. (Cl. 24—134)

My invention relates to improvement in clothesline fasteners for securing the ends of the line together, the principal object in view being to provide a simply constructed, inexpensive and strong device of this character for connecting the ends together so that pull on said ends will tighten the connection, and which may be easily adjusted into and from connecting position.

Another object is to provide a device of this character which will not injure the line and will not get out of order.

To the accomplishment of the above, and subordinate objects presently appearing, a preferred embodiment of my invention has been illustrated in the accompanying drawing, set forth in detail in the succeeding description and defined in the claims appended hereto.

In said drawing:

Figure 1 is a view in side elevation of the preferred embodiment of my invention applied, Figure 2 is a view in top plan, the fastener being detached, Figure 3 is a view in end elevation looking at the clamping end of the fastener, and Figure 4 is a view in end elevation looking at the other end of the fastener.

Referring to the drawing by numerals, the fastener of my invention comprises, as its basic element, a clip-like member 1 of sheet metal including a tranversely U-shaped elongated body part 2, and a pair of laterally spaced arms 3 extending obliquely from one end of said part in parallel relation and having apertured outer ends for receiving a pivot pin 4 for a purpose presently seen. The opposite end of the body part is apertured, as at 5, for the attachment of one end 6 of the line thereto, as by extending the same into said end and through said aperture and knotting said end of the line as at 7. Fitting in member 1 is a second elongated, clip-like sheet metal member 8 of U-shape, transversely, having a straight bottom and sides and fitting lengthwise in the member 1 with said bottom opposed to the bottom of the member 1 and adapted to seat against the same. The other end 9 of the line is adapted to be extended through the member 8 and clamped against the bottom thereof, said member 8 forming one part of clamping means, the other member of which comprises the following. Pivoted at one end on the pin 4 to swing in opposite directions into and out of member 8, respectively, in the plane thereof, is a lever-like clamping dog 10 having its other end serrated as at 11. The dog 10 is adapted to be swung into the member 8 with the end 11 into engagement with said end 9 of the line to clamp the same to the bottom of the member 8 and to assume a dead center locking position relative to pivot 4, so that under outward pull on said end 9 the clamping action is increased. The member 8 has its sides pivoted, as at 12, at the outer end of the member to the dog 10 intermediate the ends of said dog 10 so that under swinging of said dog into clamping position said member 8 is swung into the member 1. As will be obvious, by swinging the dog 10 out of the member 8 its clamping engagement with the end 9 of the line will be broken and the member 8 swung out of member 1 as illustrated in dotted lines in Figure 1.

In the use of the described fastener, the end 9 of the line is threaded into and through the member 8 between the bottom of the same and the dog 10 with the latter swung out of the member 8, and the member 8 swung out of the member 1. With the end 9 of the line pulled taut, by hand, the member 8 is swung into member 1 thereby swinging the dog 10 into the member 8 into clamping relation to the line as will be clear. To break the connection, it is merely necessary to swing the member 8 in the proper direction, such swinging thereof causing the dog 10 to be swung in the proper direction to release the end 9 of the line in the manner already described.

The free end of the member 8 is partially closed by bending the edges of the sides thereof together at said end so as to form a finger grip 13 for use in pulling the member 8 in the proper direction.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

What I claim is:

1. A fastener for securing the ends of a rope line together comprising a clip-like sheet metal member including a transversely U-shaped body part and a pair of opposed arms extending obliquely from one end of said part, said body part having a bottom aperture in the opposite end thereof for the extension of one end of the line therethrough to secure said end of the line to the member, a clamping dog pivoted at one end to the terminals of said arms to swing between the same inwardly and outwardly of the member into and from clamping position and having a free clamping end, and a second clip-like sheet metal member for receiving the other end of said line adapted to fit into the first mentioned member, said second member having sides pivoted to said dog intermediate the ends of the latter and a bottom seating on the bottom of the first mentioned member in the clamping position of the dog and coacting with the free clamping end of said dog to grip the other end of said line therebetween, said dog in the clamping position thereof forming together with the pivot thereof and bottom of the second mentioned member, a dead center lock frictionally resisting outward pull on said other end of the line.

2. A fastener for securing the ends of a rope line together comprising a clip-like sheet metal member including a transversely U-shaped body part and a pair of opposed arms extending obliquely from one end of said part, said body part having a bottom aperture in the opposite end thereof for the extension of one end of the line therethrough to secure said end of the line to the member, a clamping dog pivoted at one end to the terminals of said arms to swing between the same inwardly and outwardly of the member into and from clamping position and having a free clamping end, and a second clip-like sheet metal member for receiving the other end of said line adapted to fit into the first mentioned member, said second member having sides pivoted to said dog intermediate the ends of the latter and a bottom seating on the bottom of the first mentioned member in the clamping position of the dog and coacting with the free clamping end of said dog to grip the other end of said line therebetween, said dog in the clamping position thereof forming together with the pivot thereof and bottom of the second mentioned member, a dead center lock frictionally resisting outward pull on said other end of the line, the free clamping end of said dog being serrated.

ALPHONSE LAQUERRE.